W. R. MORRISON.
ARMORED PNEUMATIC TIRE.
APPLICATION FILED MAY 12, 1913.
1,130,995.
Patented Mar. 9, 1915.
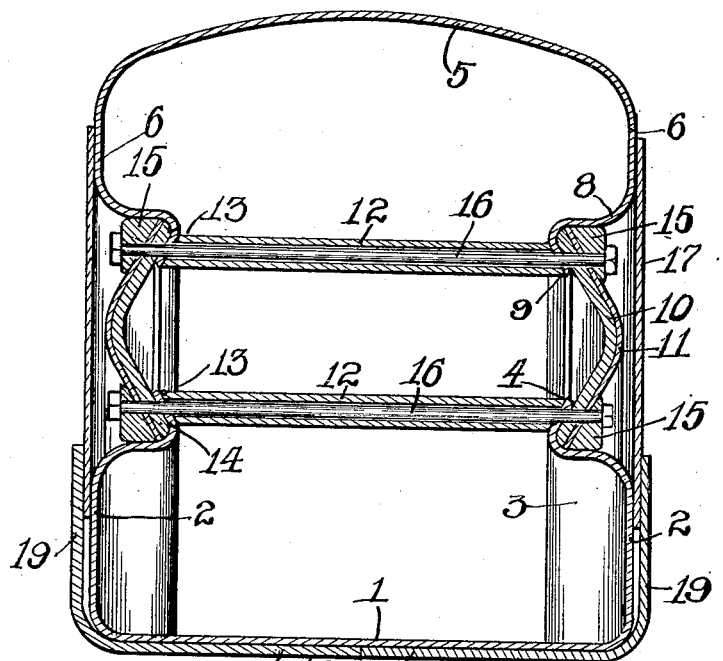
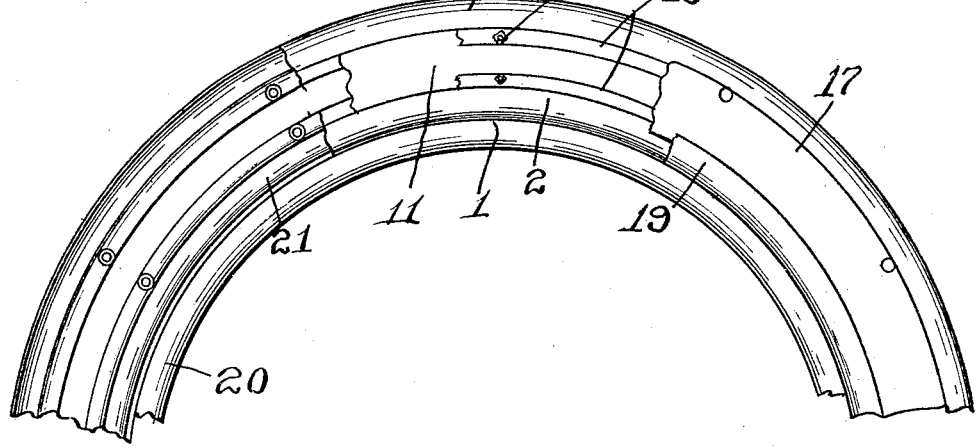

UNITED STATES PATENT OFFICE.

WILLIAM ROBERT MORRISON, OF CHICAGO, ILLINOIS.

ARMORED PNEUMATIC TIRE.

1,130,995.  Specification of Letters Patent.  Patented Mar. 9, 1915.

Application filed May 12, 1913. Serial No. 767,000.

*To all whom it may concern:*

Be it known that I, WILLIAM ROBERT MORRISON, a citizen of the United States, and a resident of the city of Chicago, in the county of Cook and State of Illinois, have invented certain new and useful Improvements in Armored Pneumatic Tires; and I do hereby declare that the following is a full, clear, and exact description of the same, reference being had to the accompanying drawings, and to the numbers of reference marked thereon, which form a part of this specification.

This invention relates to improvements in armored pneumatic tires of that class set forth in my prior application for patent therefor, filed Feb. 2nd, 1911, Serial No. 606,095.

With the rapid introduction into use of automobiles, the resilient tire for wheels became necessary, and, although numerous devices, including various arrangements of springs, have been tried and found more or less unsatisfactory, at the present time a very large source of expense of upkeep and operation of automobiles of any kind is occasioned by the necessity of tire repairs and renewals. In the case of pneumatic tires constructed of rubber, the cutting and puncturing of tires in addition to loss due to road wear affords a considerable source of expense, as well as annoyance, for the operator.

Pneumatic tires, as such, heretofore have not been found satisfactory for use on armored automobiles, for the reason that injury and deflation of the tire occasions such a difference in the diameter of the wheels as to very promptly and injuriously affect the operation of the car, and the car itself. Furthermore, the expense occasioned in the purchase of rubber tires and the frequent renewal thereof, is a matter of serious consideration.

It is an object of this invention to afford a pneumatic tire of such a construction as to practically obviate the expense for repairs.

It is also an object of the invention to afford an armored tire which is puncture-proof and is adaptable for use for vehicles of any kind.

It is a further object of the invention to reduce the expense for the construction of tires to minimum by reducing the amount of rubber used in the device to the least possible quantity, and to afford great strength and durability by utilizing steel and other metals to afford the major portion of the construction.

It is also an object of the invention to afford a structure in which injury to the tire can be occasioned only with difficulty, whether with intent or by accident.

The invention (in a preferred form) consists in the matters hereinafter described and more fully pointed out and defined in the appended claims.

In the drawings: Figure 1 is a transverse section of a tire embodying my invention. Fig. 2 is a reduced and fragmentary side elevation thereof.

As shown in the drawings: a channeled rim, having a web 1, adapted to fit upon the felly of the wheel, and parallel upwardly directed flanges, one on each side thereof, which extend substantially straight upwardly for a portion indicated by 2, and thence curved inwardly at their rear inner margins 3, upwardly and outwardly, is shown, in Fig. 1, and at the edges 4, are rounded to afford a non-cutting edge. A similar tread embracing a metallic channel member having a convex web 5; to afford a tread, inwardly directed and curved flanges 6, and the inwardly and then outwardly curved portions 8, corresponding with a similarly curved portion 3, of the rim channel, and likewise having a rounded edge 9, is arranged over and around the rim channel, as shown, and the inner diameter of the flange of the tread channel is sufficiently greater than the outer diameter of the flange of the rim channel to afford a broad space therebetween on each side of the channel.

An annular web or sheet 10, which may be constructed of rawhide, rubber, rubberized canvas, or any suitable material impervious to air, is rigidly secured to the flat, outwardly inclined faces provided therefor adjacent to the rounded edge 4, on each flange, and a second sheet 11, of relatively great tensile strength, is secured to said sheet 10, in position to reinforce the same. Tubular members 12, provided with beveled ends 13, are rigidly secured to the inner sides of the corresponding inner faces of the flanges 14, of the rim channel, by brazing, or in any other suitable manner, and act to space the said flanges a predetermined distance apart. Annular bands 15, are provided for the ends of said webs or sheets 10 and 11, which are so constructed that they will bear firmly against the curved portions 3, and 8, of the respective webs 1 and 5, as well as clamp the ends of the sheets 10 and 11, tightly against the outer face of the flange 14, and afford a reinforcement therefor. As shown in Fig. 1, the webs or sheets 10 and 11, and the annular bands 15, are firmly secured in position by means of bolts 16, which extend through the same and the tubular spacing member 12, and act when tightened to clamp the flanges 14, sheets 10 and 11, and the annular bands 15, firmly against the beveled ends of the spacing members 12.

Means are provided for sustaining any lateral stress due to turning corners. For this purpose, as shown, an annular thrust flange 17, is rigidly secured on each side of the tread channel, and the inner periphery of this ring extends alongside the straight wall of the flange 2, of the rim channel, fitting closely thereagainst at all times. An angle bar is secured on each side the rim channel with the web 18, thereof, extending beneath and rigidly secured to the web of the channel for approximately half the width of said channel, and a flange 19, extends upwardly alongside the flange of the channel and above the inner periphery of the thrust flange 17, and thereby afford a space between the flange of the rim flange and the flange 19, of the angle bar in which the thrust flange must move.

The device may be secured upon the felly in any suitable manner. As shown, the felly 20, has secured on each side thereof an annular clamping band 21, the clenching flange of which projects upwardly on each side of the tire to firmly hold the same from lateral movement on the felly. Of course, it is to be understood that an air valve of any suitable kind may be connected in the tire casing through the felly and the web of the rim flange, and that for this purpose, any suitable connection may be used to afford a tight joint to prevent leakage around the valve stem.

The operation is as follows: In assembling, the tread is slipped over the rim channel and the flexible annular webs or packing members 10 and 11, are next put in place between the curved portions 3 and 8, of the respective flanges on the channels 1 and 5. The annular clamping bands 15, are then firmly engaged against the ends of the same by means of the bolts 16, which extend therethrough and firmly clamp the same together with the ends of the packing members or webs against the outer face of the flange 14, which is reinforced by the tubular members 12. The pressed flanges are next secured in place, the annular angle strips are then secured to the face of the tread channel by means of screws or bolts and the device is secured upon the rim by means of the clamping rings 21, or any other suitable device for that purpose. The tire is then inflated to afford the desired air pressure within the case so formed.

Of course, a characteristic tread will preferably be secured on the outer face of the tread channel. This, however, is omitted as forming no part of this invention. In use, the load is at all times secured upon the pneumatic cushion afforded within the tire, the load, of course, being sustained largely upon the resilient annular members 10 and 11, which are held normally outward by air pressure and permit a slight eccentric yield of the tread member upon the rim when the tread member encounters an obstruction in the road. Should a leak occur, or even in the event of the complete deflation of the tire, said annular members 10 and 11, are made sufficiently strong to carry the load to a point of repair.

Of course, in the smaller sizes of tires, the thrust flanges may be omitted except in those instances in which the flexible connecting band may be exposed to unusual danger of injury, as, for example, where a tire is used on an armored automobile. When so used, the thrust flanges are also preferably used, inasmuch as the same afford armored plates to protect the only vulnerable part of the tire.

Of course, I am aware that details of the construction may be varied to a wide degree, and I have shown but one of numerous embodiments of my invention. I therefore do not purpose limiting the patent otherwise than necessitated by the prior art.

I claim as my invention:

1. In a device of the class described, rim and tread members, oppositely directed flanges on each side of said rim and tread members which are substantially straight for a portion of their length and then curved inwardly and near their margins outwardly, transverse tubular members connecting the inner faces of the outwardly curved portions of said flanges, flexible air tight connections between the corresponding flanges of said rim and tread channel, annular rings positioned against the ends of said flexible connections, and bolts extending through said tubular members, flanges, flexible connections and annular rings, and adapted when tightened to firmly bind said annular rings and flexible members firmly against said respective rim and tread flanges.

2. In a device of the class described, rim and tread members, transverse tubular members connecting the inner faces of the rim and tread members, flexible air tight connections between the corresponding sides of said rim and tread members, annular rings positioned against the ends of said flexible connections, and bolts extending through said tubular members, flexible connections and annular rings and adapted when tightened to firmly bind said annular rings and flexible members firmly against said respective rim and tread flanges.

3. In a device of the class described, rim and tread members, flanges integral therewith, transverse tubular members extending within said tread members and connecting the inner faces of said flanges, flexible air tight connections between the corresponding sides of said flanges, and bolts extending through said transverse tubular members and flexible connections and adapted when tightened to firmly bind said flexible members against the sides of said flanges.

In testimony whereof I have hereunto subscribed my name in the presence of two subscribing witnesses.

WILLIAM ROBERT MORRISON.

Witnesses:
CHARLES W. HILLS, Jr.,
LEON M. REIBSTEIN.

Copies of this patent may be obtained for five cents each, by addressing the "Commissioner of Patents, Washington, D. C."